Patented Oct. 18, 1938

2,133,870

UNITED STATES PATENT OFFICE 2,133,870

RESINOUS COMPOSITIONS AND METHODS FOR PREPARING SAME

Birger W. Nordlander and Maynard C. Agens, Schenectady, N. Y., assignors to General Electric Company, a corporation of New York No Drawing. Application August 31, 1935, Serial No. 38,808

9 Claims. (Cl. 260—8)

The present invention relates to resinous compositions and methods for preparing them. The invention is more particularly concerned with resinous compositions of the alkyd type. Specifically, the invention is concerned with the production of resinous compositions from polybasic carboxylic acids, monobasic carboxylic acids, polyhydric alcohols and shellac in which compositions the shellac forms an integral part of the resulting resin molecule.

Shellac has heretofore been mechanically compounded with an alkyd resin for use either as a varnish or molding composition (see Weisberg Patents 1,413,144 and 1,413,145). Very little practical use, if any, has been made of shellac-drying oil combinations, due to the incompatability of shellac with drying oils under the usual conditions of varnish manufacture. In order to dissolve shellac directly in the fatty oils, very high temperatures, 380 to 390° C., are required and the shellac must be added very slowly in powdered form. The great care which must be exercised to avoid gelation makes the process impractical commercially.

According to the present invention methods are provided for the incorporation of shellac into the alkyd resin molecule by technique which can be adapted to commercial operations and resinous compositions are provided which have valuable properties for use in the varnish, lacquer and paint fields. The resinous compositions of the present invention may be prepared in the form of air-drying and baking types of materials and hence are of wide application. Varnishes of outstanding properties for general use in the electrical insulation field may be prepared from them. After air-drying or curing the films possess excellent oil, water and ageing resistance and unusual toughness and elasticity. Various other outstanding properties will be apparent from the following description of the resinous compositions of the present invention.

In order that the invention may be fully appreciated and practiced by those skilled in the art to which it pertains, the general principles of the invention will be first outlined and detailed examples then given.

Generally speaking, our invention comprises the preparation of the new resinous compositions by 1. Re-esterifying shellac with a polyhydric alcohol, such as glycerol, then reacting the resulting mixture of hydroxy esters first with a monobasic acid, such as a fatty oil acid (oleic acid, or linseed oil acids, for instance), abietic acid, etc., to cause combination with part of the free hydroxyl groups, and finally reacting with a dibasic acid or anhydride, such as phthalic anhydride, to tie up the remaining free hydroxyl groups.

2. Esterifying a part of the free hydroxyl groups of shellac with a monobasic acid, such as a fatty oil acid, abietic acid, etc., and the free acid carboxyl groups of shellac with a polyhydric alcohol, and subsequently completing the reaction with a dibasic acid or anhydride.

3. Esterifying the free carboxyl groups of shellac with a polyhydric alcohol and completing the reaction with a monobasic acid and a dibasic acid.

4. Using the fatty oils and re-esterifying them with a polyhydric alcohol, such as glycerol, and then reacting the resulting hydroxy ester with the acid carboxyl groups of shellac and finally reacting the product which still contains free hydroxyl groups with dibasic acid or anhydride.

5. Employing combinations of the foregoing processes.

The foregoing processes produce a chemical union between all the reactants, the shellac forming an integral part of the resulting resin molecule. In the practice of our invention we have found it useful to base our calculations of the formula for the resin to be prepared by making the total number of carboxyl groups balance the total number of reactive hydroxyl groups. The latter may preferably be taken as consisting of all of the hydroxyl groups in the glycerol plus one-half of the total hydroxyl groups in shellac. This has been deduced from experiments which have indicated that for the length of time of reaction and the temperature conditions employed in making these resins, only about one-half of the hydroxyl groups in shellac combine. This practice of basing the calculations as outlined need not be adhered to too strictly, and depending on the desired product, any ratio of total hydroxyl to total carboxyl may be chosen.

The following examples of our invention are illustrative of the general methods to be employed in producing the resinous compositions:

METHOD 1

The shellac is slowly added to hot glycerol and the heating continued until re-esterification has taken place as evidenced by a drop of the mixture remaining clear when cooled to room temperature. A monobasic acid, such as fatty oil acids, abietic acid, etc., is then added and the reaction carried further until a low acid value is reached. A dibasic acid or anhydride is then added and the resin cooked to a cure time of about 5 to 10 seconds. While the resin made by this or the following methods to be described are cooked to a 5 to 10 second cure at 200° C. it is obvious that the end point may be selected by the manufacturer to suit his particular requirements as to how far he wishes the resin carried in the cook. The following example illustrates this method:

Example 1

| | Per cent by weight |
|---|---|
| Shellac | 20.4 |
| Glycerol | 15.3 |
| Linseed oil acids | 45.0 |
| Phthalic anhydride | 19.3 |

The shellac was slowly added to the glycerol at 180° C. over a period of one hour. The temperature was then raised to 200° C., and maintained for 30 to 40 minutes. A drop of the mixture when cool formed a clear blend. The oil acids were then added and the temperature raised to 215 to 220° C. for 2.5 hours. Care was taken to avoid the loss of any glycerol. During this time the acid value was reduced from 128.5 to 10.6. The temperature was then lowered and the phthalic anhydride added. The reaction was continued at 200 to 225° C. for one hour.

The product consisted of a viscous, dark red, syrupy resin having an acid value of 37 and a cure time of 8 seconds at 200° C. It was found to be easily soluble in the common resin solvents such as: benzol, toluol, solvent naphtha, ethyl alcohol-benzol (1:1), butyl alcohol, cellosolve, dioxan, acetone, butyl acetate, mono chlor benzene, ethylene dichloride, pyridine.

It dissolved in linseed oil at 200 to 250° C. and in China-wood oil at 160° C. Some short heating was required to make the blend remain homogeneous at room temperature. A 25% solution of this resin in benzol air-dried tack-free in 16 hours at room temperature without the aid of a drier.

Method 2

The shellac and the fatty oil acids are reacted together, causing the hydroxyl groups of the shellac to esterify with some of the carboxyl groups of the fatty oil acids. The remaining carboxyl groups are made to combine with excess of glycerol. A dibasic acid or anhydride is finally incorporated to tie together the molecular aggregates formed in the previous reactions. The reaction is stopped when a cure time of 5 to 10 seconds at 200° C. has been reached. As an illustration of this method we cite the following example:

Example 2

| | Per cent by weight |
|---|---|
| Shellac | 31.6 |
| Soya bean oil acids | 47.5 |
| Glycerol | 9.1 |
| Phthalic anhydride | 11.8 |

The fatty oil acids were heated to 190° C. and while being maintained at this temperature the shellac was incorporated over a period of 6 minutes. After four more minutes heating a clear blend of these two constituents had formed. The heating was continued at 185 to 190° C. for one-half hour. At this point the acid value of the reaction mixture had dropped from an original figure of 149 to 108, showing that a reaction was taking place. The cure time was then about 10 seconds at 200° C. The temperature was now allowed to drop to 160° C. and the glycerol was added. The heating was continued at 195 to 205° C. for 1½ hours. The cure time at the end of this period had increased to about 30 seconds at 200° C. The temperature was raised to 220 to 230° C. and maintained for 2 hours. The acid value had then dropped to 8. The temperature was again dropped to 160° C. and the phthalic anhydride added. The resin was then cooked to a finish with the temperature gradually being raised to 220° C.

The product consisted of a dark red, very viscous, syrupy resin, with an acid value of 41 and a cure time of 8 seconds at 200° C.

It proved to be soluble in the same solvents cited in the previous example, with the exception that it did not remain completely in solution in cellosolve when the solution was cooled down to room temperature.

Strips of metals (copper and sheet iron) coated with a 50% solution of this resin in toluol and baked for ½ hour at 200° C. gave smooth, very tough films, insoluble in the solvents in which the resin originally was soluble.

Method 3

Glycerol and a fatty oil are heated together at an elevated temperature until re-esterification is completed. The addition of a small amount of a base such as $K_2CO_3$, MgO, ZnO, etc., materially speeds up this process. To the resulting blend shellac is slowly added with heating and stirring. When all shellac is incorporated and most of it combined chemically, as evidenced by a low acid value of the reaction mixture, the dibasic anhydride or acid is added and the cooking continued until a cure time of 5 to 10 seconds at 200° C. is reached.

Example 3

| | Per cent by weight |
|---|---|
| Linseed oil | 41.5 |
| Glycerol | 9.1 |
| Shellac | 30.4 |
| Phthalic anhydride | 19.0 |

The linseed oil and the glycerol were heated together for 2 hours at 250° C. with .1% $K_2CO_3$ as a re-esterification catalyst. Maintaining the temperature at 225 to 230° C. the shellac was incorporated during the next two hours, the acid value at no time being higher than about 10 to 11. The phthalic anhydride was then added and the cooking continued for ¾ hour.

The product consisted of a reddish brown, soft, sticky, rubbery resin, having an acid value of 55 and a cure time of 6 seconds at 200° C. It was soluble in the solvents given in Example 1, with the exception of butyl alcohol, in which it was completely soluble only at elevated temperatures.

A film from a 25% solution in benzol air-dried tack-free in 25 hours without the aid of a drier.

Method 4

Glycerol, shellac and a fatty oil acid are heated together at an elevated temperature until completely blended, as evidenced by a drop remaining clear and homogeneous when cooled to room temperature. A dibasic acid or anhydride such as phthalic anhydride, is then added and the reaction continued until the product reaches a cure time of 5 to 10 seconds at 200° C. The following example serves to illustrate this method:

Example 4

| | Per cent by weight |
|---|---|
| Shellac | 46.6 |
| Oleic acid | 37.6 |
| Glycerol | 6.5 |
| Phthalic anhydride | 9.3 |

The shellac, oleic acid and glycerol were heated together at 150 to 185° C. for about 40 minutes when a homogeneous blend formed, having a cure time of about 20 seconds at 200° C. During this period the acid value dropped from 120 to 56. The phthalic anhydride was then added and the mixture cooked to a finish at 150 to 200° C.

The product consisted of a dark red, sticky, rubbery mass, very tough in consistency, having an acid value of 87 and a cure time of about 10 seconds at 200° C. It was soluble in all the solvent cited in Example 1.

Three parts of this resin were dissolved in two parts of linseed oil by heating at about 200° C. This solution was heated further for 10 to 15 minutes at 200° C. giving a product which consisted of a dark red, soft viscous syrup, having an acid value of 40 and a cure time of 10 seconds at 200° C. One part of this product dissolved in three parts of benzol formed a varnish, which when applied on glass and metal strips air-dried tack-free in 24 hours at room temperature without any drier. A similar combination of three parts of the original resin and two parts of China-wood oil formed a blend at 170° C. Twelve minutes further heating at about 200° C. produced a product consisting of a dark red, soft, viscous syrup with an acid value of 42 and a cure time of 8 seconds at 200° C. One part of this product dissolved in three parts of benzol gave a varnish which air-dried tack-free at room temperature without the aid of driers in 8 hours time.

Method 5

Glycerol and a fatty oil are re-esterified as in Method 3. A monobasic acid, such as a fatty oil acid, abietic acid, etc. is incorporated and the shellac added to the mixture at such a rate that the temperature is maintained at 225° to 230° C. To the resulting reaction mixture a dibasic acid or anhydride, such as maleic anhydride, is added and the cooking continued until a cure time of 5 to 10 seconds at 200° C. is reached.

Example 5

| | Per cent by weight |
|---|---|
| Soya bean oil | 31.7 |
| Glycerol | 6.5 |
| Soya bean oil acids | 18.1 |
| Shellac | 36.6 |
| Maleic anhydride | 7.1 |
| | 100.0 |

The oil and the glycerol were heated together for 2 hours at 250° C. with 0.1% MgO as a re-esterification catalyst. The fatty oil acids were incorporated in this blend. Maintaining the temperature of the resulting mixture at 225 to 230° C., the shellac was now introduced during the next half hour. The reaction was continued for two more hours at about this temperature. At the end of this period the acid value had been reduced to 10. The temperature was lowered to 120° C. and the maleic anhydride added. The temperature was now brought up to 190° C. and maintained there to the end of the reaction.

The product consisted of a dark red, sticky, rubbery resin, having an acid value of 43 and a cure time of five seconds at 200° C. It was soluble in benzol, toluol, solvent naphtha, ethyl alcohol-benzol (1:1) etc.

A solution in solvent naphtha formed a varnish which when baked on metal, fabrics, etc. gave very tough, hard, flexible films of light color.

Method 6

The shellac is first dissolved in the fatty oil acids under heating and stirring. The solution is added to a re-esterified fatty oil-glycerol mixture, obtained as described in Method 3. The resulting combined mixture is then heated until a cure time of about 20 seconds at 200° C. is reached. The dibasic acid or anhydride is now added and the heating continued until a 5 to 10 seconds' cure time is reached.

Example 6

| | Per cent by weight |
|---|---|
| Soya bean oil | 26.9 |
| Glycerol | 5.6 |
| Linseed oil acids | 15.5 |
| Shellac | 39.6 |
| Phthalic anhydride | 12.4 |

The shellac and fatty oil acids were heated together for about 15 minutes at 160 to 170° C., when all shellac had gone into solution. The fatty oil and the glycerol were re-esterified in a separate reaction vessel at 250° C. for two hours with 0.1% MgO as a re-esterification catalyst. The shellac-fatty oil acid blend was incorporated in this mixture and the temperature maintained for 2 hours at about 225° C. At the end of this period the acid value was 14 and the cure time was 20 seconds at 200° C. The reaction mixture was cooled to 150° C. and the phthalic anhydride added. The temperature was slowly raised to 200° C. and the resin cooked to a finish.

The product consisted of a dark reddish, sticky, viscous, syrupy resin, having an acid value of 58 and a cure time of 8 seconds at 200° C. It was soluble in the solvents listed in Example 1.

The resin can be air-dried from solution. When baked on metal or fabrics it gave a very tough, hard, flexible film of somewhat darker color than that obtained from the varnish prepared in Example 5.

Method 7

A mixture of a fatty oil such as soya bean oil, a polyhydric alcohol, such as glycerol, and a monobasic acid, such as the acids derived from the drying oils, is heated to an elevated temperature, say 225° C., and shellac incorporated with stirring. The heating is continued until re-esterification and combination has been accomplished, as evidenced by a drop remaining homogeneous when cooled down to room temperature, and by a low acid value. A dibasic acid, such as maleic acid or anhydride, is then added and the resin cooked until a cure time of 5 to 10 seconds at 200° C. is reached.

As an illustration of this method we give the following example:

Example 7

| | Per cent by weight |
|---|---|
| Soya bean oil | 31.0 |
| Glycerol | 6.4 |
| Soya bean oil acids | 17.7 |
| Shellac | 35.9 |
| Maleic anhydride | 9.0 |

The oil, glycerol and oil acids were mixed together and raised to a temperature of 225 to 230° C. Maintaining the temperature at this level and stirring the mixture, the shellac was introduced during the next half hour. After all the shellac had been incorporated, a clear, homogeneous syrup soon formed, a drop of which would remain clear when cooled to room temperature. The heating was continued for one hour at the same temperature. At the end of this period the acid value had dropped to 16. The temperature was now lowered to about 150° C. and the maleic anhydride added. The temperature was then brought up to 190 to 195° C. and maintained there to the end of the reaction.

The product consisted of a dark red, very viscous syrupy resin, having an acid value of 63 and a cure time of 5 seconds at 200° C. It was soluble in linseed oil at 250° C. and in Chinawood oil at 100° C. It was also soluble in the common resin solvents listed in Example 1.

In the examples cited the various periods of time specified are illustrative of the times requisite for the reaction of laboratory scale quantities of materials and where larger batches are prepared it is apparent that corresponding changes in time of addition of reactants, period of heating, etc. may be necessary.

While these examples have been limited to one polyhydric alcohol, glycerol; two dibasic acids, phthalic and maleic; and three types of monobasic acids, linseed oil acids, soya bean oil acids and oleic acid, the methods are applicable to many other alcohols or acids. Suitable polyhydric alcohols in addition to or instead of glycerol are ethylene glycol, butylene glycol, diethylene glycol, pentaerythritol, etc.

As polybasic acids other than or in addition to the two mentioned above, one or more of such acids as succinic, sebacic, adipic, citric, etc., or any acid produced by the diene synthesis may be used, for example, an acid anhydride formed by adding maleic anhydride to a conjugated diolefine or a similar compound having a conjugate system of double bonds.

As modifying monobasic acids it is also possible to use stearic, lactic, benzoic, salicylic, abietic, China-wood oil fatty acids, cotton seed oil fatty acids, pine tar oil acids, sunflower oil fatty acids, fish oil acids, etc., either alone or in mixture with any of the others. If so desired, natural resins, i. e. rosin, etc., may also be incorporated.

In order to reduce the acid value further, a high boiling monohydric alcohol may be added toward the end of the reaction, such as butyl Carbitol, butyl Cellosolve, Carbitol, lauryl alcohol, stearyl alcohol, etc. Small amounts of basic oxides such as ZnO, PbO, MgO, etc. may also be added for the same purpose.

Obviously the proportions given in the examples are merely illustrative in character and may be varied in accordance with the end product desired.

The resins obtained by any of these methods may be used with great advantage to produce varnishes of outstanding properties for general use in the electrical insulation field. As an illustration of one application in this field, alkyd resin varnished cloths having dielectric properties of practical interest have been made. We may cite the following figures obtained on cambric made by us using a shellac modified alkyd resin prepared according to Method 5.

| Temp. °C. | Power factor (60 cycles) | Loss factor |
|---|---|---|
| 30 | 0.039 | 0.14 |
| 60 | 0.027 | 0.11 |
| 100 | 0.112 | 0.44 |

Such varnished cloth showed an average dielectric strength of 1100 volts per mil (at room temperature). It also exhibited excellent oil, water and ageing resistance and most unusual toughness and elasticity. When such a varnish was baked on metal, the dielectric strength was of the order of 2000 volts per mil, the film being exceedingly tough and hard. The varnish may therefore be used as a wire enamel.

The toughness and elasticity of the baked film was remarkable, the metal upon passing through a severe punching operation breaking before the varnish film. Such varnishes may, therefore, be used to prepare varnished metal sheets, from which, subsequently, various objects may be punched out without injury to the protective film. This property might find application for instance in the canning industry, in the manufacture of cans having an interior protective film of baked-on varnish.

What we claim as new and desire to secure by Letters Patent of the United States is:

1. The method of preparing a resinous composition which comprises forming a homogeneous reaction product consisting of a chemical combination of shellac, polyhydric alcohol and fatty substance selected from the class consisting of fatty oil, fatty oil acid and mixtures of fatty oil and fatty oil acid, and chemically uniting with said reaction product a polybasic carboxylic acid, said method being carried out with ingredients so proportioned that the shellac and fatty substance together constitute a major proportion by weight of the starting materials.

2. A resinous composition which is the product of the method of claim 1.

3. The method of preparing a resinous composition which comprises partially esterifying shellac with a fatty oil acid, completing the esterification of remaining carboxyl groups with an excess of polyhydric alcohol, and chemically reacting the mass so formed with a dibasic carboxylic acid, said method being carried out with ingredients so proportioned that the shellac and fatty oil acid constitute the major proportion by weight of the starting materials.

4. A resinous composition which is the product of the method of claim 3.

5. The method of preparing a resinous composition which comprises reacting together under heat a polyhydric alcohol with a fatty oil until re-esterification is completed, chemically combining shellac with the above mass, and finally heating the blend with a dibasic carboxylic acid, said method being carried out with ingredients so proportioned that the shellac and fatty oil form a preponderant amount by weight of the starting materials.

6. The method of preparing a resinous composition which comprises heating together at an elevated temperature a polyhydric alcohol, shellac and a fatty oil acid until completely blended, and reacting with the blend a dibasic carboxylic acid, said method being carried out with ingredients so proportioned that the shellac and fatty oil acid constitute the main part by weight of the starting materials.

7. The method of preparing a resinous composition which comprises re-esterifying a fatty oil with a polyhydric alcohol, incorporating a fatty oil acid with the mass and adding shellac thereto at a rate such that the temperature is maintained at 225 to 230° C., and finally reacting the blend with a dibasic carboxylic acid, said method being carried out with ingredients so proportioned that the shellac, fatty oil and fatty oil acid constitute the main part by weight of the starting materials.

8. The method of preparing a resinous composition which comprises dissolving under heat shellac in fatty oil acids, adding the solution to a re-esterified fatty oil-glycerol mixture, heating the resulting combined mixture and finally adding a dibasic carboxylic acid and heating the entire mass, said method being carried out with ingredients so proportioned that the shellac, fatty oil and fatty oil acid form a preponderant amount by weight of the starting materials.

9. The method of preparing a resinous composition which comprises heating at an elevated temperature a mixture of fatty oil, polyhydric alcohol, and a fatty oil acid, incorporating shellac and heating the mass until re-esterification and chemical combination results, and finally heating the blend with a dibasic carboxylic acid, said method being carried out with ingredients so proportioned that the shellac, fatty oil and fatty oil acid constitute the main part by weight of the starting materials.

BIRGER W. NORDLANDER.
MAYNARD C. AGENS.